United States Patent
Raux

(10) Patent No.: US 10,364,723 B2
(45) Date of Patent: Jul. 30, 2019

(54) METHOD FOR DEPOLLUTING EXHAUST GAS, NOTABLY FROM INTERNAL-COMBUSTION ENGINES, IN PARTICULAR FOR MOTOR VEHICLES, AND PLANT USING SAME

(71) Applicant: IFP Energies nouvelles, Rueil-Malmasion (FR)

(72) Inventor: Stéphane Raux, Orlienas (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 147 days.

(21) Appl. No.: 15/036,564

(22) PCT Filed: Oct. 31, 2014

(86) PCT No.: PCT/EP2014/073471
§ 371 (c)(1),
(2) Date: May 13, 2016

(87) PCT Pub. No.: WO2015/071121
PCT Pub. Date: May 21, 2015

(65) Prior Publication Data
US 2016/0298514 A1    Oct. 13, 2016

(30) Foreign Application Priority Data
Nov. 15, 2013   (FR) ...................... 13 61158

(51) Int. Cl.
*F01N 3/20* (2006.01)
*F01N 3/10* (2006.01)

(52) U.S. Cl.
CPC ............. *F01N 3/208* (2013.01); *F01N 3/106* (2013.01); *F01N 3/206* (2013.01);
(Continued)

(58) Field of Classification Search
CPC ... F01N 2610/04; F01N 3/206; F01N 2610/06
See application file for complete search history.

(56) References Cited

U.S. PATENT DOCUMENTS 7,254,939 B2 *   8/2007   Duvinage .............. B01D 53/90
                                                      60/274
8,181,445 B2 *   5/2012   Duvinage .......... B01D 53/9454
                                                      60/286
(Continued)

FOREIGN PATENT DOCUMENTS

DE   102008001709 A1 *  11/2009  ............. B01D 53/90
EP     2 194 249 A1       6/2010
(Continued)

OTHER PUBLICATIONS

Machine English translation of DE102008001709.*
(Continued)

*Primary Examiner* — Patrick D Maines
(74) *Attorney, Agent, or Firm* — Fitch, Even, Tabin & Flannery LLP

(57) ABSTRACT

The present invention is a method for removing pollution from exhaust gas circulating in an exhaust line (12) of an internal-combustion engine. The exhaust line comprises an ammonia-sensitive catalyst (46) with selective NOx catalytic reduction traversed by the gas and an injector (56, 58) for injecting a reductant of the pollutants The catalyst decomposes the reductant into a hydrogen gas phase and an ammonia gas phase and, for a gas temperature below approximately 150° C. injects the hydrogen into the exhaust line in combination with a hydrogen-sensitive NOx catalyst.

9 Claims, 2 Drawing Sheets

(52) U.S. Cl.
CPC ...... *F01N 2240/32* (2013.01); *F01N 2240/34* (2013.01); *F01N 2560/06* (2013.01); *F01N 2610/02* (2013.01); *F01N 2610/04* (2013.01); *F01N 2610/10* (2013.01); *F01N 2610/1406* (2013.01); *Y02A 50/2325* (2018.01); *Y02T 10/24* (2013.01)

(56) References Cited

U.S. PATENT DOCUMENTS

| | | | |
|---|---|---|---|
| 8,562,929 B2 * | 10/2013 | Botte | C25B 1/00 |
| | | | 205/464 |
| 2006/0010857 A1 | 1/2006 | Hu et al. | |
| 2012/0004830 A1 * | 1/2012 | Miyagawa | F01N 5/02 |
| | | | 701/103 |
| 2014/0230408 A1 * | 8/2014 | Gonze | F01N 3/10 |
| | | | 60/274 |

FOREIGN PATENT DOCUMENTS

| | | |
|---|---|---|
| WO | 2011/123620 A1 | 10/2011 |
| WO | 2012/027368 A1 | 3/2012 |

OTHER PUBLICATIONS

International Search Report dated Feb. 24, 2015 for PCT/EP2014/073471; English Translation submitted herewith (5 Pages).
Written Opinion of the International Search Authority dated Feb. 24, 2015 for PCT/EP2014/073471 (5 Pages).

* cited by examiner

METHOD FOR DEPOLLUTING EXHAUST GAS, NOTABLY FROM INTERNAL-COMBUSTION ENGINES, IN PARTICULAR FOR MOTOR VEHICLES, AND PLANT USING SAME

CROSS REFERENCE TO RELATED APPLICATIONS

Reference is made to PCT Application PCT/EP2014/073471 filed Oct. 31, 2014, and French Patent Application No. 13/61.158 filed Nov. 15, 2013, which are incorporated herein by reference in their entirety.

BACKGROUND OF THE INVENTION

Field of the Invention

The present invention relates to a method for removing pollutants from exhaust gas, notably from internal-combustion engines and in particular for motor vehicles. More particularly, the invention is a method for treating pollutants contained in the exhaust gas of an autoignition internal-combustion engine, notably of Diesel type, but it is also applicable to other engines such as a method for removing pollutants from spark-ignition engines, such as those running on gas fuel or on gasoline, and in particular with a lean mixture.

The invention also concerns exhaust gas treatment using the method of the invention

Description of Prior Art

As it is well known, exhaust gases from engines contain many pollutants such as unburnt hydrocarbons, carbon monoxide, nitrogen oxides (NO and $NO_2$), which is more commonly referred to as NOx, for engines running on gasoline or gas, and additionally particles from Diesel type engines.

It is widely understood that NOx emissions result from combustion occurring at high temperatures and with high oxygen content. These conditions are generally encountered in any type of combustion and in particular to those taking place under lean burn conditions, such as direct injection in lean burn mode, whatever the fuel being used.

NOx emissions involve a major drawback in that they have a harmful effect directly on human health and indirectly through the secondary formation of tropospheric ozone.

In order to comply with emission standards and to preserve the environment and human health, it has become necessary to treat these pollutants prior to discharging the exhaust gas into the atmosphere.

As it is generally well known, this is achieved by a treatment for removing pollutants in the exhaust gas circulating in the exhaust line of the engine.

Thus, in order to treat the unburnt hydrocarbons and the carbon monoxide from engines running with a lean mixture, catalysts such as an oxidation catalyst are arranged on the exhaust line.

Regarding the exhaust gas of a Diesel engine, a particle filter is advantageously arranged on this line to capture and to remove the particles present in the exhaust gas, and to avoid their discharge into the atmosphere.

This filter, which can also be a catalyzed filter, needs to be periodically regenerated in order to maintain its filtration capacity by achieving combustion of the particles retained in this filter. These regeneration operations are mainly by increasing the filter temperature, generally through exothermic oxidation, on a catalyst arranged upstream from the filter, for reducing chemical species resulting from the combustion or from an injection directly at the exhaust.

Regarding the NOx emissions, the exhaust gas also flows through other catalyst, notably catalysts of SCR (Selective Catalytic Reduction) type. This SCR catalyst allows selective reduction of the NOx to nitrogen through the action of a reductant.

This reductant, which is generally injected upstream from the SCR catalyst, can be ammonia or a compound generating ammonia by decomposition, such as urea, or a hydrocarbon from a hydrocarbon-containing substance.

Currently, the commonest technique for NOx depollution is SCR catalysis using ammonia.

This ammonia is indirectly obtained by decomposition of a precursor injected in liquid form, generally an aqueous urea solution of 32.5 mass % urea, better known under the brand name "AdBlue" or "DEF".

Thus, the urea solution is injected into the exhaust line upstream from the SCR catalyst. The water contained in this solution is rapidly vaporized under the effect of the exhaust gas temperature, then each urea molecule decomposes in two stages into two ammonia molecules:

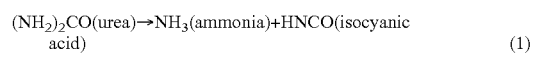

(1)

(2)

Alternatively, ammonia can be directly injected into the exhaust line upstream from the SCR catalyst.

As described in more detail in WO-2011/123,620 or WO-2012/027,368, this ammonia can come from an ammonia storage system or from a urea electrolysis operation.

Indeed, this electrolysis produces ammonia and nitrogen at one electrode and hydrogen at the other. The ammonia and the nitrogen are fed into the exhaust line upstream from the SCR catalyst and the hydrogen is used as fuel for the internal-combustion engine to improve the energy efficiency thereof.

Although these techniques are satisfactory, they however involve quite significant drawbacks.

In fact, for a given SCR catalyst, the reaction efficiency mainly depends on the NO and $NO_2$ composition of the NOx, and on the gas temperature and flow rate.

Thus, at temperatures below approximately 150° C., catalysis through SCR of NOx with ammonia is inactive or hardly active. Furthermore, when using a urea-based precursor, for exhaust gas temperatures below approximately 180° C., vaporization of the water contained in the urea solution is difficult to obtain, as well as decomposition of the urea into ammonia and isocyanic acid. Deposits are then likely to form and eventually cause clogging of the exhaust line. Under such temperature conditions, injection of the urea solution into the exhaust line is generally avoided.

The NOx are therefore discharged to the atmosphere without being treated by the SCR catalyst.

The present invention aims to overcome the aforementioned drawbacks by a method and a plant allowing implementation of low-temperature SCR catalysis operations in a simple and inexpensive manner.

SUMMARY OF THE INVENTION

The present invention thus relates to a method for removing pollutants as the exhaust gas circulating in an exhaust line, from an internal-combustion engine. The line comprises an ammonia-sensitive catalyst with selective nitrogen oxides catalytic reduction traversed by the gas and an injector for injecting a reductant into the line in order to treat the pollutants upon passage of the gas through catalyst, comprising:

decomposing the reductant into a compound with a hydrogen gas phase and a compound with an ammonia gas phase; and for an exhaust gas temperature below approximately 150° C., injecting the hydrogen gas phase into the exhaust line in combination with a hydrogen-sensitive NOx catalyst for treating the pollutants in this gas.

The method can use a catalyst with SCR as the hydrogen-sensitive NOx catalyst.

The method can use an oxidation catalyst as the hydrogen-sensitive NOx catalyst.

The method can, for an exhaust gas temperature above approximately 150° C., inject the ammonia gas phase into the exhaust line in combination with the ammonia-sensitive catalysis with NOx selective catalytic reduction for treating the pollutants in this gas.

The method can, for an exhaust gas temperature above approximately 180° C., inject the reductant into the exhaust line in combination with the ammonia-sensitive catalyst with NOx SCR for treating the pollutants in this gas.

The method can, for an exhaust gas temperature below approximately 150° C., inject the hydrogen gas phase into the exhaust line in combination with at least one additional catalyst.

The method can decompose the reductant by electrolysis.

The method can place at least one of the compounds in a tank.

The method can control the injection of at least one of the compounds by a metering valve.

The invention also relates to an apparatus for removing pollutants from the exhaust gas circulating in an exhaust line, notably from an internal-combustion engine, comprising an ammonia-sensitive catalysis with selective NOx catalytic reduction disposed in the exhaust line, an injector for injecting a reductant into the line in order to treat the pollutants upon passage of the gas through the catalyst and a means for electrolysis of the reductant, # wherein the exhaust line comprises a hydrogen-sensitive NOx catalysis and an injector for a hydrogen gas phase compound coming from the electrolysis.

The plant can comprise a SCR catalyst as the hydrogen-sensitive NOx catalyst.

The plant can comprise an oxidation catalyst as the hydrogen-sensitive NOx catalyst.

The exhaust line can comprise an injector for an ammonia gas phase compound coming from the electrolysis system for injecting the ammonia upstream from the ammonia-sensitive catalyst with NOx selective catalytic reduction.

The exhaust line can comprise at least one additional catalysis combined with an injector of a hydrogen gas phase compound coming from the electrolysis system.

The apparatus can comprise a metering valve disposed in the pipe which connects the electrolysis system to the injector.

The plant can comprise a tank disposed in the pipe connecting the electrolysis system to the injector.

BRIEF DESCRIPTION OF THE DRAWINGS

Other features and advantages of the invention will be clear from reading the description given hereafter by way of non-limitative example, with reference to the accompanying figures wherein.

DETAILED DESCRIPTION OF THE INVENTION

Figure 1:
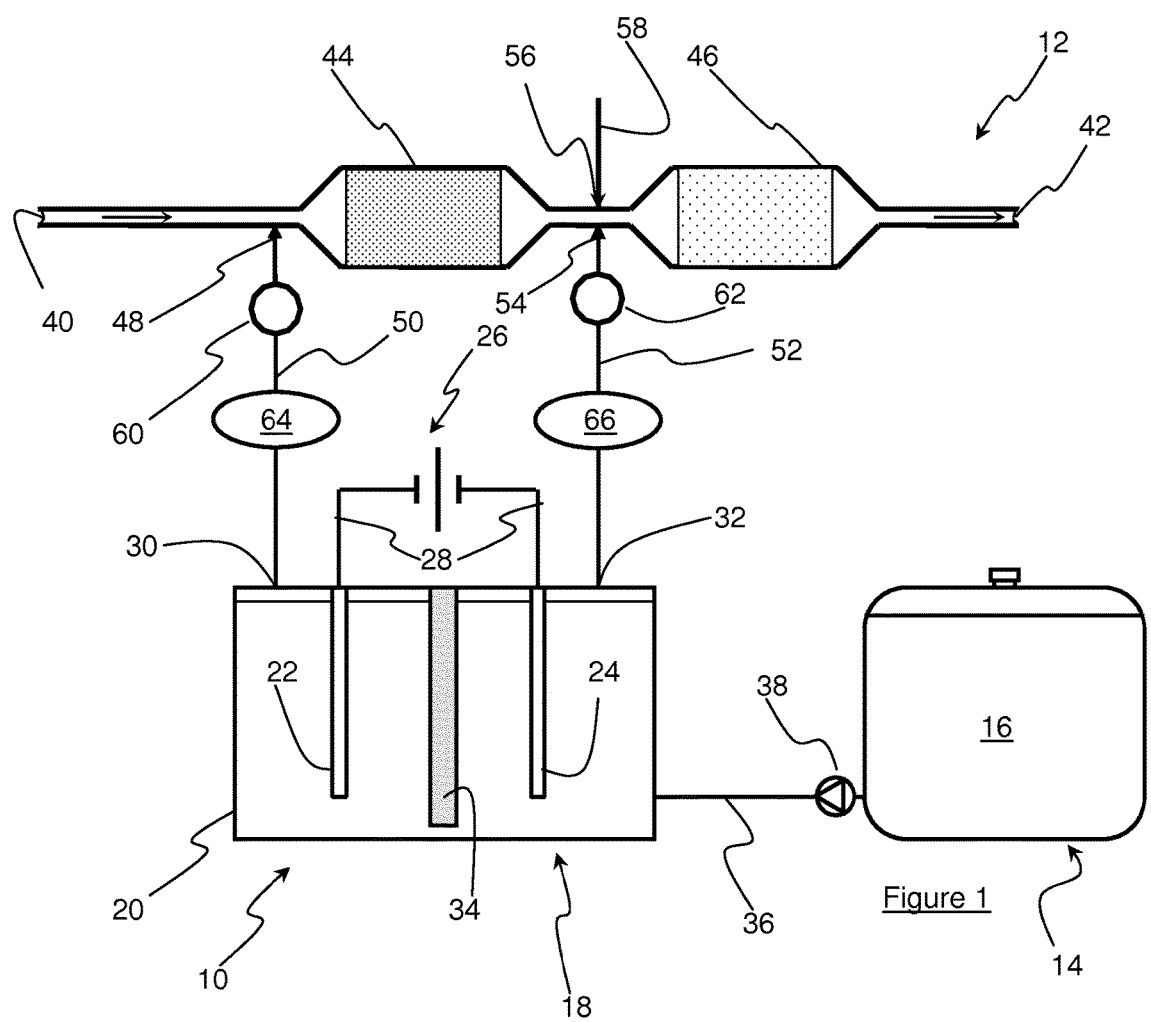
FIG. 1 illustrates an apparatus using the method according to the invention.

The exhaust gas treating apparatus for removing pollutants comprises an electrolysis system 10 for a urea-based precursor and an exhaust line 12 combined therewith.

Exhaust gas is understood to be the exhaust gases coming from an internal-combustion engine, notably for a motor vehicle, but the invention is not limited to thereto and is useful for heating other gas types resulting from a combustion, such as flue gas from boilers.

The electrolysis system for the urea-based precursor, which is described more in detail in WO-2011/123,620 and WO-2012/027,368, comprises a tank 14 containing precursor 16, which preferably is an aqueous solution, and an electrolysis cell 18.

In order to simplify the rest of the description, the urea-based precursor is simply referred to hereafter as urea.

The cell comprises a closed chamber 20 for reception of the urea 16 coming from the tank, a cathode 22 and an anode 24 housed within the chamber and immersed in the urea, an electric power source 26 supplying electrical power through electrical conductors 28 to the anode and the cathode, and discharge outlets 30 and 32 for the compounds resulting from the electrolysis.

The electrical power source can have different origins, such as batteries, fuel cells, etc.

As described in the aforementioned documents, the cell allows production by electrolysis of a compound having an ammonia ($NH_3$) and nitrogen ($N_2$) gas phases, and as another compound having a hydrogen ($H_2$) gas phase.

For simplification reasons, in the rest of the description, outlet 30 is considered to be the one that discharges the hydrogen gas phase and outlet 32 is considered to be the one allowing discharge of the ammonia and nitrogen gas phase.

Advantageously, a partition wall 34 is arranged in the chamber which separates cathode 22 from anode 24 and outlet 30 from outlet 32 and isolates the hydrogen gas phase from the ammonia and nitrogen gas phase located in the upper part of the chamber.

This chamber is supplied with urea in liquid form through a pipe 36 connecting the bottom of this chamber to tank 14. Advantageously, this pipe comprises a metering pump 38 providing sufficient filling of the chamber for the anode and the cathode to be constantly immersed in the urea.

As can be better seen in FIG. 1, exhaust line 12 comprises, in the direction of circulation of the exhaust gas from inlet 40 of this line to outlet 42, at least one SCR catalyst for NOx catalysis. More precisely, this line comprises two catalysts, a catalyst referred to as hydrogen catalyst 44 that reacts to form hydrogen which is located close to the exhaust gas inlet. This catalyst is followed in series by a SCR catalyst, referred to as ammonia catalyst 46, which provides NOx reduction by ammonia.

Of course, without departing from the scope of the invention, hydrogen catalyst 44 can be an oxidation catalyst or another SCR catalyst.

In order to simplify the rest of the description below, the example chosen for the hydrogen catalyst is that of a SCR catalyst.

In a manner known per se, the exhaust line carries a temperature detector (not shown) arranged at the exhaust line inlet providing knowledge at any time of the temperature of the exhaust gas circulating in the line.

Alternatively, logic and/or computer can be provided, which allow an estimation at any time of the temperature of the exhaust gas circulating in the line.

As is better visible in FIG. 1, hydrogen outlet 30 is connected to a hydrogen injector 48 disposed in the line upstream from hydrogen catalyst 44 by a pipe 50. Similarly, the ammonia and nitrogen outlet is connected by a pipe 52, to an ammonia and nitrogen injector 54 located upstream from ammonia catalyst 46 between the hydrogen catalyst and this ammonia catalyst. Finally, line 12 carries, in a manner known per se, a urea injector 56 arranged upstream from ammonia catalyst 46 and connected by a pipe 58 to a urea injection circuit (not shown) to which tank 14 is connected.

Advantageously, at least one of the pipes, and here both of the pipes, carry a metering valve 60 and 62 allowing controlling at least one of the proportion of hydrogen (valve 60) and the proportion of ammonia and nitrogen (valve 62) that is injected into the exhaust line.

Similarly, the pipes can carry e buffer tanks 64 and 66 where respectively hydrogen is stored in tank 64, and ammonia in tank 66 which is produced by cell 18.

Of course, electrical source 26, pump 38 and valves 60, 62 are managed by any control such as a calculator.

During operation and considering that at least one of the tanks does not contain a sufficient amount of compounds (hydrogen and/or ammonia) to ensure NOx reduction, and for exhaust gas temperatures below approximately 150° C., in particular upon start-up, electrolysis cell 18 is made operational by powering cathode 22 and anode 24.

Powering allows hydrogen to be generated at outlet 30 of the cell, and ammonia and nitrogen at outlet 32.

Simultaneously with the generation of hydrogen and ammonia by cell 18, valve 62 for ammonia is set to closed position while valve 60 is set to open position.

Hydrogen is thus injected upstream from hydrogen catalyst 44 by injector 48 via hydrogen tank 64 while ammonia is stored in ammonia tank 66.

Of course, if the amount of hydrogen and ammonia contained in tanks 64 and 66 is sufficient, cell 18 is not activated, and valves 60 and 62 are controlled as described above.

The hydrogen injection allows treatment of the NOx contained in the exhaust gas that will flow through catalyst 44.

Indeed, the applicant has been able to highlight through various analyses that hydrogen is an excellent NOx reductant, with temperatures on the order of just 100° C.

By way of example, SCR catalysts using hydrogen with a composition based on $Pt/SiO_2$ or $Pt/MgCeO$ or $Pt/WO_3/ZrO_2$ have shown good activity and selectivity from 90° C. onwards.

$Ag/Al_2O_3$ type catalysts are also good candidates.

Tests conducted with a SAPO-34 platinum zeolite-based catalyst obtained NO conversion ratios of 78% with a selectivity towards $N_2$ of 75% at a GHSV of 80,000 $h^{-1}$ and a gas temperature of 120° C.

Advantageously, the amounts of hydrogen required for SCR catalysis are very low. Considering the reaction $2H_2 + 2NO \rightarrow N_2 + 2H_2O$ and the need to reduce by, for example, 0.4 g NOx during the first 400 seconds of a NEDC cycle, 40 mg $H_2$ are necessary (reaction yield estimated at 66% here).

As soon as the exhaust gas temperature is above 150° C., hydrogen valve 60 is set to closed position to stop the injection of hydrogen in line 12 while storing the hydrogen in hydrogen tank 64.

Simultaneously, ammonia valve 62 is set to open position and the ammonia contained in tank 66 is fed through ammonia injector 54 to the exhaust gas circulating in line 12 between catalysts 44 and 46.

The NOx present in the exhaust gas is then treated by catalysis using ammonia in catalyst 46.

Once the exhaust gas has reached a high temperature (of the order of 180° C. to 200° C.), ammonia injection is stopped by shutting valve 62 and cell 18 is made non-operational by cutting off the power supply from source 26.

Treatment of the NOx from the exhaust gas is thereafter performed in a conventional manner by injecting urea into line 12 through injector 56 arranged between catalysts 44 and 46.

This apparatus and the method linked of the invention allow the NOx treatment to be provided over a very wide temperature range between about 100° C. to over 450° C.

Of course, a person skilled in the art will consider all actions necessary and essential to control the metering valves (injection time, flow rate, etc.) to obtain the sufficient amount of compound upstream from the various catalysts to provide removal of pollutants from the exhaust gas after passage through SCR catalysts 44 and 46.

It should be noted that cell 18 can be active upon conventional NOx treatment with urea to ensure the production and storage of hydrogen and ammonia in tanks 64 and 66. These compounds can thus be used for a future engine startup with exhaust gas temperatures of about 150° C.

Figure 2:
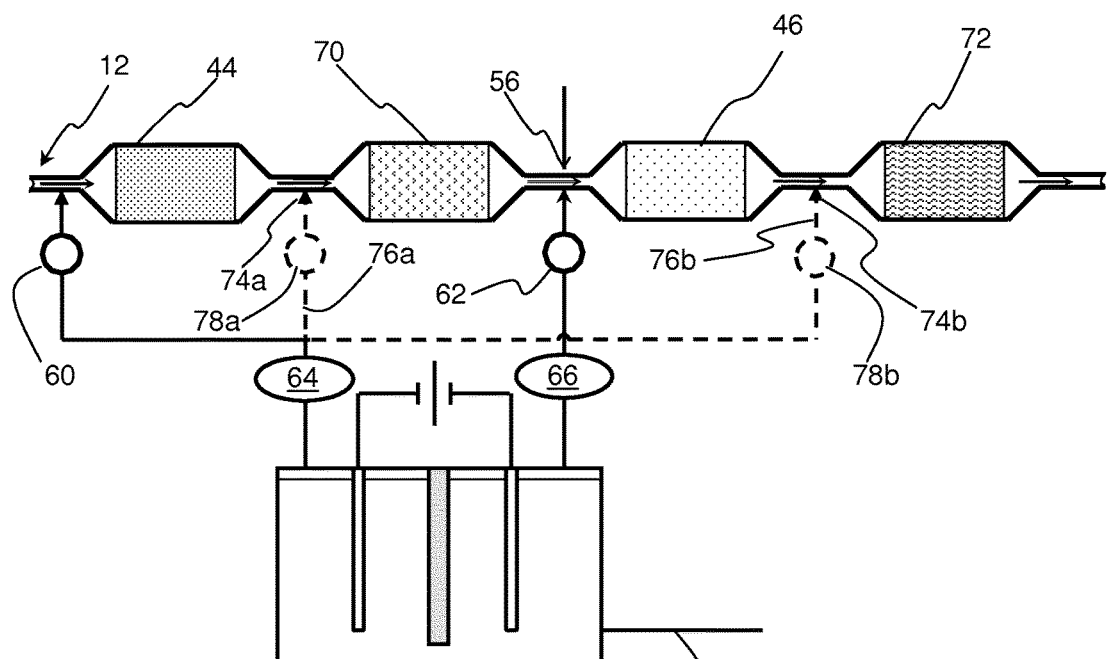
FIG. 2 illustrates a first variant of FIG. 1.
Figure 3:
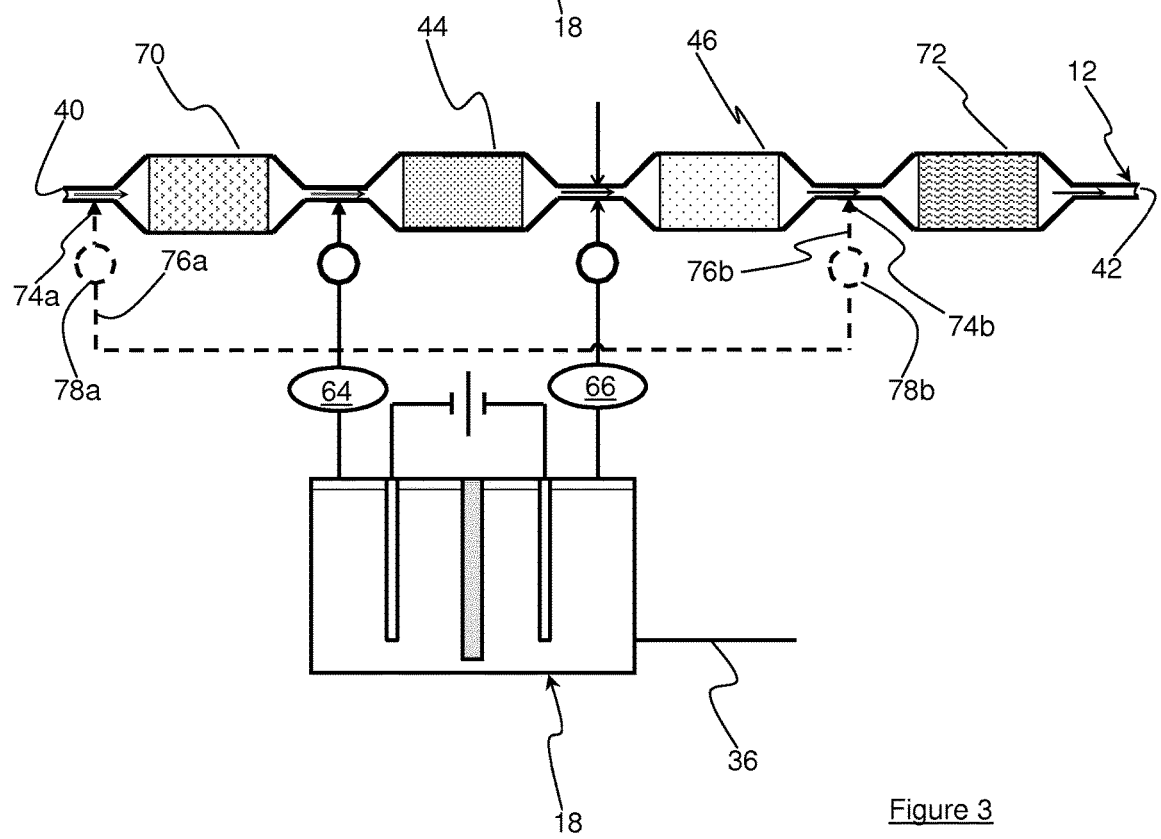
FIG. 3 illustrates another variant of FIG. 1.

The examples of FIGS. 2 and 3 illustrate the various possibilities of use of hydrogen for priming other catalysts, and with particle filter regeneration notably.

The example of FIG. 2 illustrates the possibility of placing an additional catalyst 70 in the exhaust line 12 between SCR hydrogen catalyst 44 and SCR ammonia catalyst 46. Another additional catalyst 72 can also be arranged in this line after SCR ammonia catalyst 46.

In the example shown, the additional catalysts can be an oxidation catalyst or a three-way catalyst, or a particle filter, catalyzed or not.

As better visible in FIG. 2, additional catalysts 70 and 72 are each associated with a hydrogen injector 74a and 74b arranged on the exhaust line upstream from these catalysts. Each one of these injectors is connected to hydrogen tank 64 by a pipe 76a and 76b each carrying a metering valve 78a and 78b.

Thus, when starting the vehicle at exhaust gas temperatures below approximately 150° C., cell 18 is made operational as described above by generating hydrogen and ammonia.

Upon starting the vehicle, ammonia valve 62 is set to closed position while valve 60 is set to open position for injecting hydrogen upstream from hydrogen catalyst 44 through injector 48. Optionally, at least one of valves 78a and 78b are set to open position for injecting hydrogen upstream from at least one of additional catalysts 70 and/or 72 respectively through at least one of injectors 74a and 74b, or for thermal catalyst priming when using an oxidation catalyst.

This hydrogen injection allows treatment of the NOx contained in the exhaust gas that flows through catalyst 44 and increasing the exhaust gas temperature to initiate the catalysis operations of at least one of catalysts 70 and/or 72.

As soon as the temperature reaches a sufficient threshold value, on the order of 150° C., hydrogen injection is stopped at catalyst 44 and ammonia injection is performed at SCR catalyst 46.

Of course, hydrogen injection at least one of catalysts 70 and 72 is stopped as soon as the operating temperature thereof is reached (oxidation catalyst).

After this operation, the exhaust gas depollution method is continued as described above with ammonia injection stop and urea supply into line 12 through injector 56 for gas temperatures above the 180° C.–200° C. range.

In cases where one of catalysts 70 or 72 is a catalyzed particle filter, hydrogen injection upstream from this filter, through injector 74a or 74b, can be controlled in order to assist with the combustion of particles contained in the filter.

The example of FIG. 3 differs from that of FIG. 2 in the positioning of additional catalysts 70 and 72.

In FIG. 3, additional catalyst 70 is located between exhaust gas inlet 40 and SCR hydrogen catalyst 44, and catalyst 72 is located after SCR ammonia catalyst 46 in the vicinity of exhaust gas outlet 42.

As mentioned in the description of for FIG. 2, catalysts 70 and 72 are linked to a hydrogen injector 74a and 74b, and to a pipe 76a and 76b carrying a metering valve 78a and 78b and connected to tank 64.

The principle of operation of the example of this FIG. 3 is the same as in FIG. 2.

The invention claimed is:

1. A method for removing pollutants from exhaust gas circulating in an exhaust line of an internal combustion engine, the line comprising an ammonia-sensitive catalyst providing selective catalytic reduction (SCR) of nitrogen oxides in the exhaust gas in the exhaust line and an injector for injecting a reductant into the exhaust line for treating the pollutants upon passage of the exhaust gas through the catalyst providing SCR of nitrogen oxides comprising:

decomposing the reductant into hydrogen gas and ammonia gas phase;

storing the hydrogen gas in a hydrogen gas tank and the ammonia gas phase in an ammonia gas tank;

injecting the hydrogen gas from the hydrogen gas tank into the exhaust line in contact with a hydrogen sensitive SCR NOx reduction catalyst for treating pollutants in the exhaust gas for an exhaust gas temperature below 150° C.;

injecting the ammonia gas from the ammonia gas tank into the exhaust line in contact with an ammonia SCR catalyst to provide NOx reduction for treating the pollutants in the exhaust line for exhaust gas temperatures between 150° C. and 180° C.; and injecting the reductant into the exhaust line in contact with the ammonia SCR catalyst to provide NOx reduction for treating exhaust gas at temperatures above 180° C.

2. The method as claimed in claim 1 comprising using an oxidation sensitive catalyst as a hydrogen sensitive SCR of NOx.

3. The method as claimed in claim 2 comprising injecting the hydrogen gas into the exhaust line in combination with at least one additional catalyst for treatment of exhaust gas temperatures below 150° C.

4. The method as claimed in claim 3 comprising decomposing the reductant with electrolysis.

5. The method as claimed in claim 2 comprising decomposing the reductant with electrolysis.

6. The method as claimed in claim 1 comprising injecting the hydrogen gas into the exhaust line in combination with at least one additional catalyst for treatment of exhaust gas temperatures below 150° C.

7. The method as claimed in claim 6 comprising decomposing the reductant with electrolysis.

8. The method as claimed in claim 1 comprising decomposing the reductant with electrolysis.

9. The method in accordance with claim 1 comprising controlling injection of at least one of the compounds with a metering valve.

\* \* \* \* \*